United States Patent
Bathurst

(10) Patent No.: US 10,090,932 B2
(45) Date of Patent: Oct. 2, 2018

(54) METHOD AND SYSTEM FOR TRANSMITTING A PLURALITY OF AUDIO CHANNELS OVER FREQUENCY MODULATED INFRARED BANDS

(71) Applicant: TELEVIC CONFERENCE NV, Izegem (BE)

(72) Inventor: M. Tracy Alan Bathurst, South Jordan, UT (US)

(73) Assignee: Televic Conference NV, Izegem (BE)

( * ) Notice: Subject to any disclaimer, the term of this patent is extended or adjusted under 35 U.S.C. 154(b) by 0 days.

(21) Appl. No.: 15/565,152

(22) PCT Filed: Apr. 7, 2016

(86) PCT No.: PCT/US2016/026391
§ 371 (c)(1),
(2) Date: Oct. 7, 2017

(87) PCT Pub. No.: WO2016/164547
PCT Pub. Date: Oct. 13, 2016

(65) Prior Publication Data
US 2018/0083709 A1    Mar. 22, 2018

(30) Foreign Application Priority Data
Apr. 7, 2015 (EP) .................................... 15162668

(51) Int. Cl.
*H04B 3/00* (2006.01)
*H04B 10/548* (2013.01)
*H04R 27/00* (2006.01)

(52) U.S. Cl.
CPC ........... *H04B 10/548* (2013.01); *H04R 27/00* (2013.01)

(58) Field of Classification Search
CPC ............................. H04B 10/548; H04R 27/00
See application file for complete search history.

(56) References Cited

U.S. PATENT DOCUMENTS

| | | | | | |
|---|---|---|---|---|---|
| 5,548,654 | A | * | 8/1996 | Fast | H04R 3/00 381/77 |
| 6,671,325 | B2 | * | 12/2003 | Lee | H04J 3/0632 375/259 |
| 2010/0142721 | A1 | * | 6/2010 | Wada | H04R 3/005 381/77 |

FOREIGN PATENT DOCUMENTS

DE         2431937 C2    4/1982

OTHER PUBLICATIONS

IEC International Standard 61603-7, entitled "Transmission systems of audio and/or video and related signals using infra-red radiation—Part 7: Digital audio signals for conference and similar applications," May 2003.

(Continued)

*Primary Examiner* — Joseph Saunders, Jr.
(74) *Attorney, Agent, or Firm* — Jacobsen IP Law

(57) ABSTRACT

The present invention pertains to a method for transmitting a plurality of audio channels over frequency modulated infrared bands, the method comprising periodically transmitting a configuration message and associated audio channel messages, said configuration message comprising an indication of the number of said audio channels, wherein the number of audio channels is greater than 32 and the number of audio channels is coded in two non-adjacent fields. The invention also pertains to a system for receiving a plurality of audio channels over frequency modulated infrared bands as transmitted according to the method described above.

20 Claims, 3 Drawing Sheets

(56) References Cited

OTHER PUBLICATIONS

Extended European Search Report from European Application No. 15162668.6, filed Apr. 7, 2015, dated Oct. 23, 2015.
International Search Report and Written Opinion from Application No. PCT/US2016/026391, filed Apr. 7, 2016, dated Aug. 29, 2016.

* cited by examiner

*a*

*b*

*c*

*d*

METHOD AND SYSTEM FOR TRANSMITTING A PLURALITY OF AUDIO CHANNELS OVER FREQUENCY MODULATED INFRARED BANDS

CROSS-REFERENCE TO RELATED APPLICATIONS

The present application claims the benefit of and the priority to European patent application EP 15 162 668 filed on 7 Apr. 2015 with the European Patent Office. The content of European patent application EP 15 162 668 is incorporated herein by reference for all purposes in its entirety including all tables, figures, and claims—as well as including an incorporation of any element or part of the description, claims or drawings not contained herein and referred to in Rule 20.5(a) of the PCT, pursuant to Rule 4.18 of the PCT.

FIELD OF THE INVENTION

The present invention pertains to methods and systems for transmitting a plurality of audio channels over frequency modulated infrared bands, and handheld devices used for receiving such audio signals. Such systems are used for example at conferences, exhibitions, guided tours, and the like.

BACKGROUND

DE 2431937 A1 in the name of Sennheiser Electronic KG describes the use of multi-channel infrared transmission of audio feeds in different languages from interpreters at a conference to receivers in headsets worn by conference delegates.

International standard IEC 61603-7, entitled "Transmission systems of audio and/or video and related signals using infra-red radiation— Part 7: Digital audio signals for conference and similar applications", describes the characteristics of a digital multiple channel, multiple carrier audio transmission system as an extension to conference interpretation or similar systems using the frequency ranges 45 kHz to 1 MHz and 2 MHz to 6 MHz.

It is a disadvantage of the known, standardized systems that the number of channels that can be transmitted is limited to 24 audio channels (6 infrared channels, with 4 audio channels each). Some system vendors have taken advantage of the structure of the IEC 61603-7 configuration message to signal the presence of up to 32 channels. Given the fact that the field used for signaling the number of audio channels in the standardized configuration message is 5 bits, 32 audio channels has been considered to be the maximum number that could be announced in a vendor-proprietary way without completely losing backward compatibility with standardized systems.

It is a purpose of embodiments of the present invention to overcome this limitation, without completely losing backward compatibility with standardized systems.

SUMMARY OF THE INVENTION

According to an aspect of the present invention, there is provided a method for transmitting a plurality of audio channels over frequency modulated infrared bands, the method comprising periodically transmitting a configuration message and associated audio channel messages, the configuration message comprising an indication of the number of the audio channels, wherein the number of the audio channels is greater than 32, and wherein the number of the audio channels is coded in two non-adjacent fields.

The invention is based on the insight of the inventors that a larger number than 32 can be coded in a configuration message, without substantively changing the structure of such message, by using several non-adjacent fields. It is an advantage of the invention that larger numbers of audio channels, which are desired by end users of conference systems, can be provided in a manner that is backward compatible with existing equipment.

In an embodiment of the method according to the present invention, the sum of the two non-adjacent fields represents the number.

In this embodiment, a first field is used to code the number of audio channels up to the encodable maximum, and the number of excess audio channels is coded in one or more other fields. In particular, when the first field is limited to a certain maximum value, the value of this first field may be fixed to this maximum for all channel allocations in excess of the maximum.

In an embodiment of the method according to the present invention, the binary concatenation of the two non-adjacent fields represents the number.

In this embodiment, a first field and one or more other fields are virtually considered as a single binary field, which is used to code a number of audio channels, the maximum of which is a multiple of the number that could be encoded if the first field alone were used.

In an embodiment of the method according to the present invention, a first one of the two non-adjacent fields consists of 5 bits.

It is an advantage of this embodiment that the structure of the configuration message of international standard IEC 61603-7 can be reused.

In a particular embodiment, the first one of the two non-adjacent fields is set to a predetermined value, and a second one of the two non-adjacent fields consists of at least 6 bits.

In this embodiment, a first field is set to a value that can be recognized by the receiver as indicative of a larger number of audio channels (for instance binary 11111), the number itself being provided in one or more of the other non-adjacent fields, which provide(s) a greater numerical range.

In an embodiment of the method according to the present invention, the configuration message further comprises an indication of respective quality levels of at least some of the audio channels.

It is an advantage of this embodiment that the available infrared channels can be divided according to the desires of the user in a larger number of lower-quality audio channels or a smaller number of higher-quality audio channels.

In an embodiment of the method according to the present invention, the plurality of bands comprises 10 bands.

It is an advantage of this embodiment that up to 40 audio channels can be transmitted.

In a particular embodiment, the bands are centered at the following respective frequencies: 2.3 MHz, 3.0 MHz, 3.7 MHz, 4.3 MHz, 5.0 MHz, 5.7 MHz, 6.3 MHz, 7.0 MHz, 7.7 MHz, and 8.3 MHz.

It is an advantage of this embodiment that the spectrum use is compatible with international standard IEC 61603-7, while the added bands are spaced in a manner consistent with the existing bands.

In an embodiment of the method according to the present invention, the audio channel messages are coded according to the IEC 61603-7 standard.

It is an advantage of this embodiment that the audio transmissions are compatible with international standard IEC 61603-7.

In an embodiment, the method according to the present invention further comprises specifying the number of the audio channels and an allocation of the audio channels in an additional message with a different message type than existing configuration messages.

It is an advantage of this embodiment that systems equipped to handle larger numbers of audio channels may be configured to recognize the new message type and operate accordingly, while existing message types are left unchanged and can be processed by legacy equipment.

According to an aspect of the present invention, there is provided a computer program product comprising code means configured to cause a processor to carry out the method as described above.

According to an aspect of the present invention, there is provided a system for transmitting a plurality of audio channels over frequency modulated infrared bands, the system comprising a processor configured to carry out the method as described above.

According to an aspect of the present invention, there is provided a system for receiving a plurality of audio channels over frequency modulated infrared bands as transmitted according to the method as described above, the system comprising a processor configured to extract the number of the audio channels from the configuration message.

The technical effects and advantages of embodiments of the systems according to the present invention correspond, mutatis mutandis, to those of the corresponding embodiments of the method according to the present invention.

BRIEF DESCRIPTION OF THE DRAWINGS

These and other features and advantages of embodiments of the present invention will now be described in more detail with reference to the accompanying drawings, in which.

DESCRIPTION OF EMBODIMENTS

Figure 1:
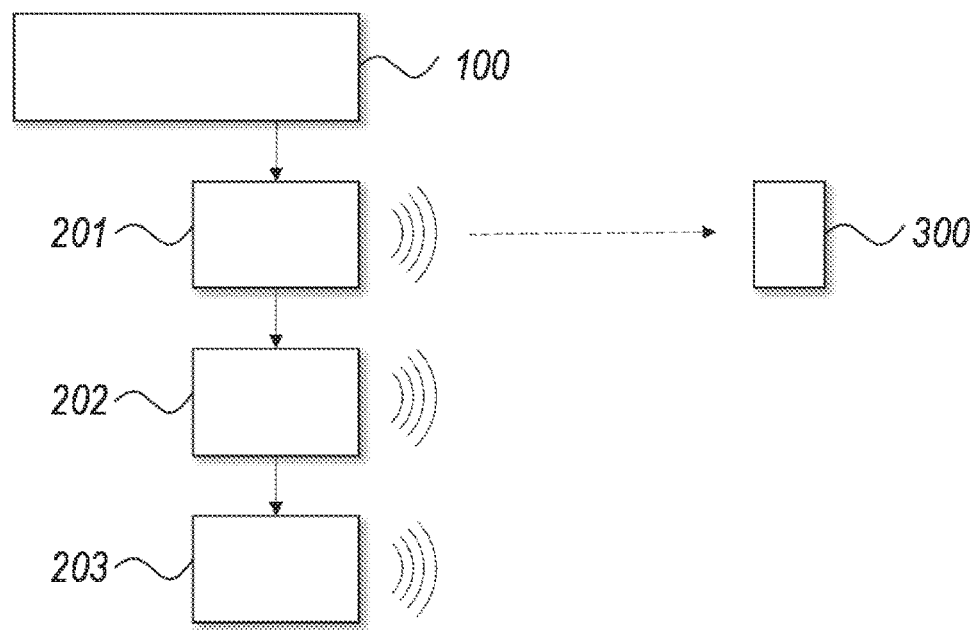
FIG. 1 schematically represents a conferencing system according to an embodiment of the present invention, the system including a signal generator, a plurality of radiators, and a plurality of receivers.

FIG. 1 schematically represents a conferencing system according to an embodiment of the present invention. The system includes a signal generator 100, sometimes referred to as the transmitter, which provides a modulated signal to one or more radiators. Without loss of generality, three radiators 201-203 are shown in the figure. The radiators 201-203 transmit the signals supplied by the signal generator 100 as an optical signal, in particular in the form of infrared radiation.

The signal transmitted by the radiators is received by handheld receivers, carried by the conference delegates. To simplify the figure, only a single exemplary receiver 300 is shown in the figure. The illustrated receiver 300 has an infrared transceiver for receiving the audio signals that are distributed in the modulated infrared signals.

The wirelessly distributed audio signals may be audio signals such as those transmitted at conferences, exhibitions, guided tours, and the like. In particular, these may be multi-channel transmissions of the same text as translated or interpreted in different languages, modulated by means of any method (e.g., separate FM-modulated frequency bands). The channels may comprise uncompressed or compressed, analog or digital signals, and may include data, control and/or management signals in addition to the audio information.

The receiver 300 is typically a handheld device. The term handheld is used to designate a general shape, size, and weight that would allow holding the device in one's hand; this does not exclude embodiments whose design is optimized for other means of carrying, such as devices with belt clips, lanyards, bracelets, etc.

According to the invention, a plurality of audio channels are transmitted over frequency modulated infrared bands. The method comprises periodically transmitting a configuration message and associated audio channel messages, wherein the configuration message comprises an indication of the number of the audio channels. The number of the audio channels is greater than 32. The number of the audio channels is coded in two non-adjacent fields.

The functions of the signal generator 100 that pertain to the formatting and transmission of the configuration messages may be implemented in dedicated hardware (e.g., ASIC), configurable hardware (e.g., FPGA), programmable components (e.g., a DSP or general purpose processor with appropriate software), or any combination thereof. The same component(s) may also include other functions.

The receiver 300 preferably comprises a processor configured to extract the number of audio channels, preferably encoded as detailed below, from the configuration message.

Figure 2:
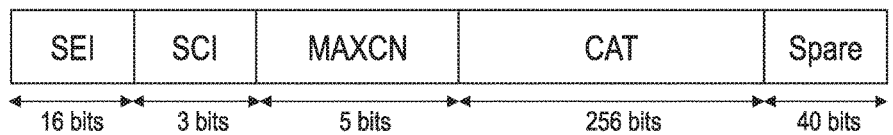
FIG. 2 schematically illustrates different formats for the configuration message used in embodiments of the present invention.
Figure 2:
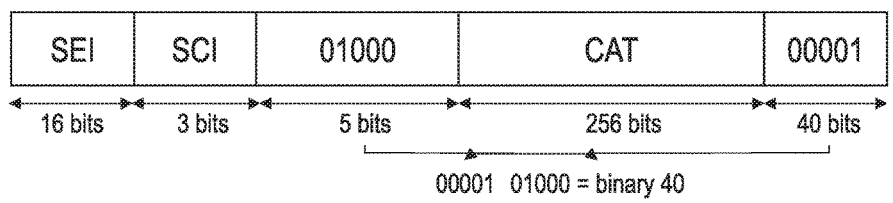
Figure 2:
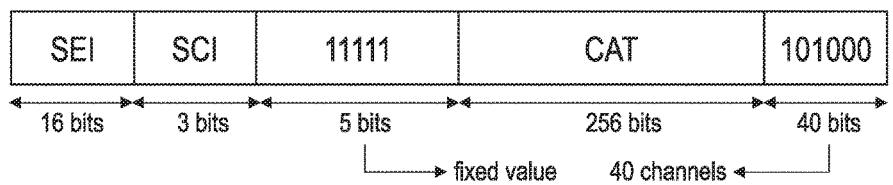
Figure 2:
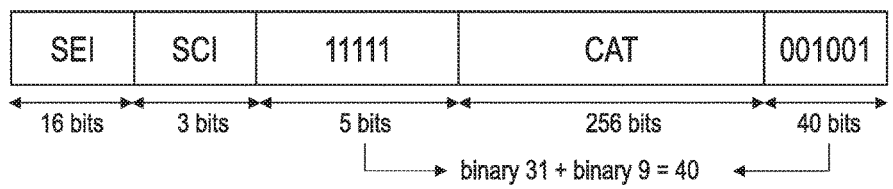

FIG. 2 illustrates several formats of a configuration message for use in embodiments of the present invention.

Format a is the general format of a configuration message according to International standard IEC 61603-7. The number of audio channels is encoded as a binary number in the 5-bit field MAXCN. The 40-bit Spare field is not used by the standard, and its contents are undefined.

Format b is a modified format according to an embodiment of the present invention. In order to allow encoding a greater number of audio channels, the original 5-bit MAXCN field is concatenated with an additional field formed as part of the Spare field (in the illustrated case, the additional field is shown as a field of 6 bits; this value is purely exemplary). The fields may be concatenated in any predetermined order. In the illustrated case, the original MAXCN field takes the place of the least significant bits. Thus, in the illustrated case, an exemplary MAXCN binary value of 01000 (8) is appended to an exemplary additional field binary value of 00001 (1), to obtain the binary number 0000101000, which is equal to decimal 40.

Format c is a modified format according to an embodiment of the present invention. In order to allow encoding a greater number of audio channels, the original 5-bit MAXCN field is set to a predetermined fixed value, and the actual number of audio channels is encoded in an additional field formed as part of the Spare field (in the illustrated case, the additional field is shown as a field of 6 bits; the size of this field should be greater than 5 bits, in order to provide a greater numerical range than the MAXCN field which is being sacrificed). In the illustrated case, the original MAXCN field is set to binary 11111, while the additional field has binary value 101000 (40). The receiver 300 is configured to recognize a MAXCN field value of binary 11111 as an indication that an additional field is used to encode a (larger) number of audio channels.

Format d is a modified format according to an embodiment of the present invention. In order to allow encoding a greater number of audio channels, the value of the original 5-bit MAXCN field is added to the value of an additional field formed as part of the Spare field (in the illustrated case, the additional field is shown as a field of 6 bits; this value is purely exemplary). Thus, in the illustrated case, an exemplary MAXCN binary value of 11111 (31) is added to an exemplary additional field binary value of 001001 (9), to obtain the binary number 0000101000, which is equal to decimal 40.

While the encoding of the number of audio channels is illustrated above with reference to the original MAXCN field and an additional field created within the Spare field, the skilled person will appreciate that other combinations of fields may be used without departing from the scope of the invention. The illustrated examples have the advantage of maximizing backward compatibility with standard compliant systems.

Figure 3:
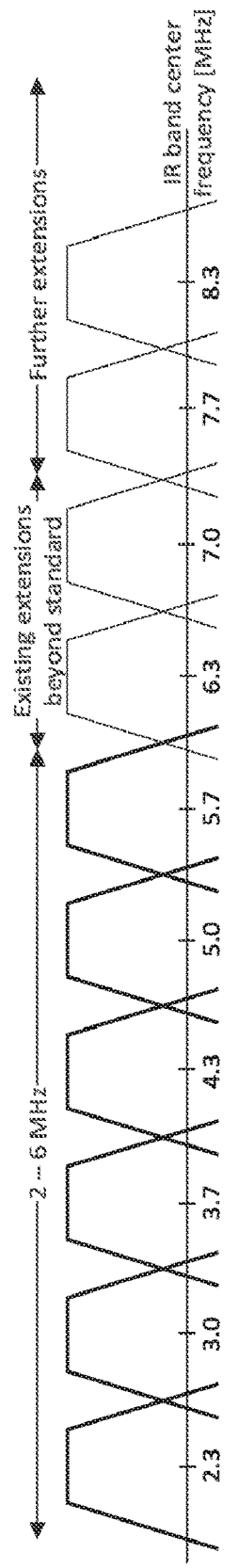
FIG. 3 schematically illustrates an exemplary bandwidth allocation for infrared channels used in embodiments of the present invention.

FIG. 3 schematically illustrates an exemplary bandwidth allocation for infrared channels used in embodiments of the present invention. As illustrated, the bands are centered at the following respective frequencies: 2.3 MHz, 3.0 MHz, 3.7 MHz, 4.3 MHz, 5.0 MHz, 5.7 MHz, 6.3 MHz, 7.0 MHz, 7.7 MHz, and 8.3 MHz. This band allocation is compatible with international standard IEC 61603-7: the lower 6 bands coincide with those of the standard, while the added bands are spaced in a manner consistent with the existing bands.

Typically, a single infrared channel (band) is used to carry four audio channels. Accordingly, the illustrated arrangement of 10 bands is suitable for carrying 40 audio channels. The number of audio channels can be reduced in order to include one or more high-quality audio channels (which take up for example twice the bandwidth of a regular audio channel). In such cases, the quality level of individual audio channels, either in the standardized bands or the bands added according to embodiments of the present invention, is preferably included in the configuration message.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

What is claimed:

1. A method for transmitting a plurality of audio channels over frequency modulated infrared bands, the method comprising periodically transmitting a configuration message and associated audio channel messages, said configuration message comprising an indication of a number of said audio channels,
   characterized in that said number of said audio channels is greater than 32, and in that said number of said audio channels is coded in two non-adjacent fields.

2. The method according to claim 1, wherein a sum of said two non-adjacent fields represents said number.

3. The method according to claim 1, wherein a binary concatenation of said two non-adjacent fields represents said number.

4. The method according to claim 1, wherein a first one of said two nonadjacent fields consists of 5 bits.

5. The method according to claim 4, wherein said first one of said two non-adjacent fields is set to a predetermined value, and a second one of said two non-adjacent fields consists of at least 6 bits.

6. The method according to claim 1, wherein said configuration message further comprises an indication of respective quality levels of at least some of said audio channels.

7. The method according to claim 1, wherein said plurality of bands comprises 10 bands.

8. The method according to claim 7, wherein said bands are centered at the following respective frequencies: 2.3 MHz, 3.0 MHz, 3.7 MHz, 4.3 MHz, 5.0 MHz, 5.7 MHz, 6.3 MHz, 7.0 MHz, 7.7 MHz, and 8.3 MHz.

9. The method according to claim 1, wherein said audio channel messages are coded according to the IEC 61603-7 standard.

10. The method according to claim 1, further comprising specifying said number of said audio channels and an allocation of said audio channels in an additional message with a different message type than existing configuration messages.

11. A non-transitory computer program product comprising code means configured to cause a processor to carry out the method according to claim 1.

12. A system for transmitting a plurality of audio channels over frequency modulated infrared bands, the system comprising a processor configured to carry out the method according to claim 1.

13. A system for receiving a plurality of audio channels over frequency modulated infrared bands as transmitted according to the method of claim 1, the system comprising a processor configured to extract said number of said audio channels from said configuration message.

14. A system for transmitting a plurality of audio channels over frequency modulated infrared bands, the system comprising a processor configured to carry out the method according to claim 2.

15. A system for receiving a plurality of audio channels over frequency modulated infrared bands as transmitted according to the method of claim 2, the system comprising a processor configured to extract said number of said audio channels from said configuration message.

16. A system for transmitting a plurality of audio channels over frequency modulated infrared bands, the system comprising a processor configured to carry out the method according to claim 3.

17. A system for receiving a plurality of audio channels over frequency modulated infrared bands as transmitted according to the method of claim 3, the system comprising a processor configured to extract said number of said audio channels from said configuration message.

18. A system for transmitting a plurality of audio channels over frequency modulated infrared bands, the system comprising a processor configured to carry out the method according to claim 6.

19. A system for receiving a plurality of audio channels over frequency modulated infrared bands as transmitted according to the method of claim 6, the system comprising a processor configured to extract said number of said audio channels from said configuration message.

20. A system for transmitting a plurality of audio channels over frequency modulated infrared bands, the system comprising a processor configured to carry out the method according to claim 9.

* * * * *